Patented Jan. 19, 1932

1,842,018

UNITED STATES PATENT OFFICE

EMIL GERMANN, OF HEIDELBERG, GERMANY, ASSIGNOR TO I. G. FARBENINDUSTRIE AKTIENGESELLSCHAFT, OF FRANKFORT-ON-THE-MAIN, GERMANY

PRODUCTION OF NITROGENOUS PRODUCTS

No Drawing. Application filed December 30, 1930, Serial No. 505,669, and in Germany January 18, 1930.

The present invention relates to the production of nitrogenous products, that is products containing nitrogen in a combined form.

I have found that products containing nitrogen which are valuable for example as fertilizers are obtained by heating the oxides or carbonates of those metals of the second group of the periodic system which have an atomic weight below 140, together with cyanic acid or substances which form cyanic acid under the conditions of the reaction. As substances which form cyanic acid and which are to be regarded as equivalents of cyanic acid for the purposes of the present invention, I may use cyanuric acid, cyamelide and ammonium cyanate, or mixtures of ammonia and carbon monoxide in the presence of such catalysts as platinum which effect the formation of cyanic acid or ammonium cyanate. The said oxides or carbonates or mixtures of the same may be heated in a current of cyanic acid gas or the initial materials may be mixed with the aforesaid solid substances which form cyanic acid, the mixtures then being heated. The temperatures used should not exceed 900° C.; they should as a rule be at least 100° C., though in some cases, for example when working with ammonium cyanate, temperatures as low as 70° C. may be used. The reaction will generally be carried out at atmospheric pressure, though higher or lower pressures may also be employed.

It is preferable to avoid the presence of oxygen or gases supplying oxygen during the process. It has been found to be advantageous to lead the cyanic acid in admixture with gases free from oxygen or which do not supply oxygen under the reaction conditions, as for example nitrogen or ammonia, over or through the said initial materials. The gases leaving the reaction chamber may be returned to the same again, injurious gases or vapours, such as carbon dioxide and water, being removed from the gases outside the reaction chamber before they are returned thereto.

The process according to the present invention may also be carried out together with the conversion of urea with calcium oxide to form calcium cyanamide, in which case urea is added to the initial materials.

Different kinds of products containing nitrogen, such as cyanates or cyanamides or mixtures of these salts, are obtained according to the present invention depending on the temperature, the duration of the reaction and the nature of the initial materials employed; thus, when treating for example calcium oxide or carbonate, calcium cyanate is obtained at temperatures below 400° C., whereas calcium cyanamide is obtained at higher temperatures; when treating barium oxide or carbonate the final product contains at 600° C. both cyanate and cyanamide, whereas after heating for several hours to 650° C. all nitrogen is present in the form of barium cyanamide. The products in many cases contain unaltered carbonates and oxides as well as decomposition products of the substances which form cyanic acid.

The following examples will further illustrate the nature of this invention, but the invention is not restricted to these examples. The parts are by weight.

Example 1

Nitrogen is passed over cyanuric acid heated to about 300° C., whereby a current of cyanic acid and nitrogen is produced, which is led through 10 parts of calcium oxide which are heated to 600° C. The gas mixture leaving the reaction chamber is cooled, whereby the excess of cyanic acid is separated in the form of cyanuric acid, and is then is led through an absorption chamber filled with quicklime to remove the carbon dioxide and water vapour formed during the conversion. The nitrogen purified in this way is mixed with an appropriate amount of fresh cyanic acid and the mixture is led into the reaction chamber again. In this manner about 12 parts of a product consisting to the extent of 60 per cent of calcium cyanamide are obtained in the course of 7 hours.

Example 2

Equal parts of calcium carbonate and cyanuric acid are intimately mixed and heated for about an hour to 650° C. in a slow current of nitrogen. A product is obtained which contains calcium cyanamide in addition to calcium carbonate or calcium oxide.

Example 3

28 parts of barium oxide are heated to 150° C. with 8 parts of cyanuric acid and 24 parts of urea until ammonia is no longer disengaged. The resulting solid mass is ground to powder and heated to 600° C. in a current of nitrogen for 2 hours. The resulting product contains 33 per cent of barium cyanamide and 42.4 per cent of barium cyanate.

Example 4

14 parts of calcium oxide and 30 parts of ammonium cyanate are intimately mixed and heated for 5 hours to 160° C. in a slow current of nitrogen. The resulting product contains 17 per cent of cyanate nitrogen and 8.4 additional per cent of nitrogen in an unknown state of combination.

Example 5

A mixture of equal parts of zinc carbonate and cyanuric acid is heated for 2 hours to about 500° C. in a slow current of nitrogen. The resulting product contains 53.4 per cent of zinc cyanamide.

What I claim is:—

1. The process of producing nitrogenous products which comprises heating with cyanic acid to temperatures of at least 70° C., but below 900° C., a substance selected from the group consisting of the oxides and carbonates of those metals of the second group of the periodic system which have an atomic weight below 140.

2. The process of producing nitrogenous products which comprises heating with cyanic acid to temperatures of at least 100° C., but below 900° C., a substance selected from the group consisting of the oxides and carbonates of those metals of the second group of the periodic system which have an atomic weight below 140.

3. The process of producing nitrogenous products which comprises heating with cyanic acid to temperatures of at least 100° C., but below 900° C., a substance selected from the group consisting of the oxides and carbonates of those metals of the second group of the periodic system which have an atomic weight below 140, while excluding oxygen and gases supplying oxygen under the conditions of working.

4. The process of producing nitrogenous products which comprises heating with cyanic acid to temperatures of at least 100° C., but below 900° C., a substance selected from the group consisting of the oxides and carbonates of those metals of the second group of the periodic system which have an atomic weight below 140, while passing a current of inert gas through the material under treatment.

5. The process of producing nitrogenous products which comprises heating with cyanic acid to temperatures of at least 100° C., but below 900° C., a substance selected from the group consisting of calcium oxide and calcium carbonate.

6. The process of producing nitrogenous products which comprises heating with cyanic acid to temperatures of at least 100° C., but below 900° C., a substance selected from the group consisting of calcium oxide and calcium carbonate, while passing a current of inert gas through the material under treatment.

In testimony whereof I have hereunto set my hand.

EMIL GERMANN.